United States Patent
Sommer

[15] 3,696,898
[45] Oct. 10, 1972

[54] CLUTCH-BRAKE UNIT

[72] Inventor: Gordon M. Sommer, Groose Pointe Woods, Mich.

[73] Assignee: G. M. Sommer Co., Inc., Detroit, Mich.

[22] Filed: Sept. 18, 1970

[21] Appl. No.: 73,665

Related U.S. Application Data

[63] Continuation of Ser. No. 809,461, March 6, 1969, abandoned.

[52] U.S. Cl..........192/18 A, 192/113 A, 192/85 CA, 192/87.16, 192/58 C
[51] Int. Cl..............................................F16d 67/04
[58] Field of Search ....192/18 A, 12 C, 87.16, 113 A

[56] References Cited

UNITED STATES PATENTS

| | | | |
|---|---|---|---|
| 2,998,872 | 9/1961 | Sommer et al. | 192/18 A |
| 2,944,647 | 7/1960 | Twyman | 192/113 A |
| 2,441,543 | 5/1948 | Longfield | 192/18 A |
| 2,836,270 | 5/1958 | Leopold | 192/12 C |
| 3,020,990 | 2/1962 | Liu | 192/18 A X |
| 3,077,968 | 2/1963 | Ahern | 192/18 A |
| 3,182,528 | 5/1965 | Lamburn | 192/18 A X |
| 3,494,450 | 2/1970 | Mankowsky et al. | 192/18 A |

FOREIGN PATENTS OR APPLICATIONS

| | | | |
|---|---|---|---|
| 764,878 | 1/1957 | Great Britain | 192/18 A |

*Primary Examiner*—Benjamin W. Wyche
*Attorney*—Harness, Dickey and Pierce

[57] ABSTRACT

A clutch-brake unit comprising a housing, axially aligned input and output shafts mounted in the housing, a non-rotatable, pneumatically actuated piston in the housing, a series of radially disposed clutch plates mounted for rotation with the input shaft, a series of radially disposed brake plates spaced axially from the clutch plates and non-rotatably attached to the housing, a series of friction discs mounted on the output shaft for rotation therewith and adapted for selective frictional engagement with the clutch and brake plates, a clutch actuating member and a brake actuating member carried on the output shaft adjacent the clutch and brake plates, means extending between the last two members, whereby the members are movable together axially of the output shaft, with movement thereof in one direction serving to simultaneously frictionally engage the clutch plates with certain of the friction discs and to release the remaining friction discs from frictional engagement with the brake plates, and with movement thereof in the other direction serving to simultaneously release the clutch plates from the frictional engagement with certain friction discs and to frictionally engage the remaining friction discs with the brake plates, and spring means mounted in one end of the housing and normally urging the piston toward a position wherein the last mentioned means effects engagement of the brake and release of the clutch.

17 Claims, 4 Drawing Figures

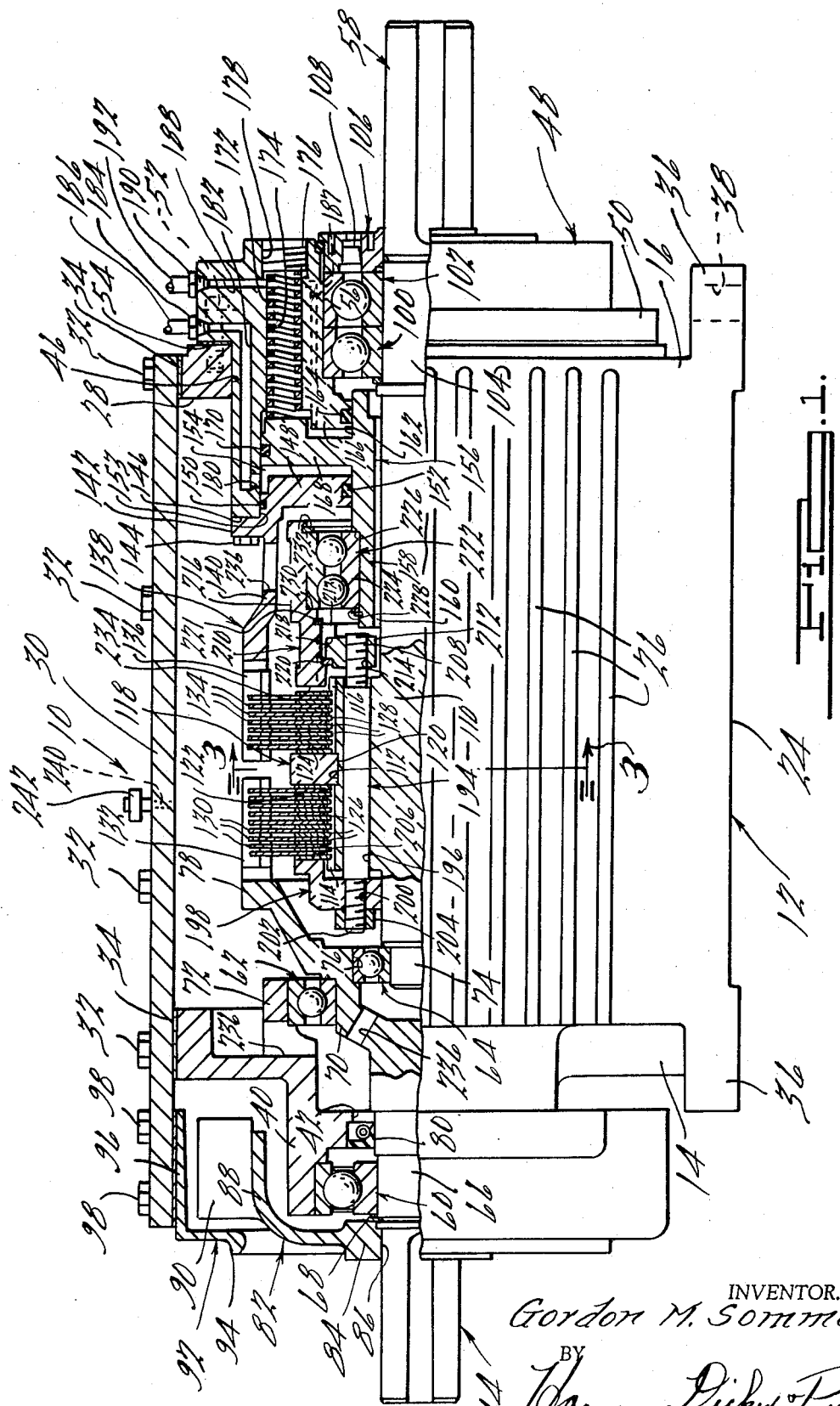

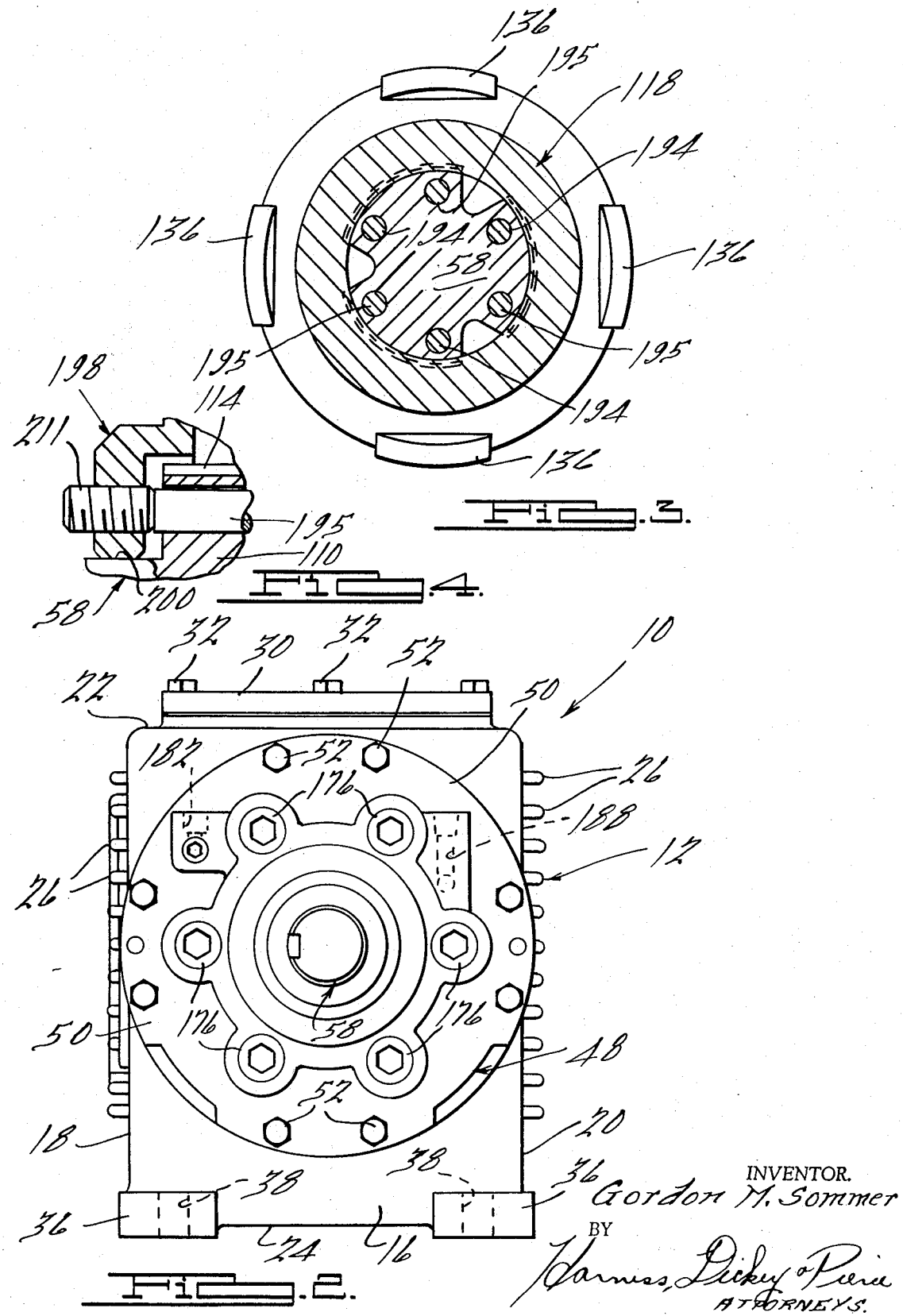

CLUTCH-BRAKE UNIT

This application is a continuation of application serial number 809,461, filed Mar. 6, 1969, and now abandoned.

SUMMARY OF THE INVENTION

The present invention relates generally to a combination clutch-brake unit and, more particularly, to a new and improved oil submerged clutch-brake unit.

An important object of the present invention is to provide a new and improved clutch-brake wherein the clutch is air operated and the brake may or may not be spring operated, depending upon the specific application of the unit.

Another important object of the present invention is to provide a new and improved clutch-brake unit of the above character wherein the clutch and brake are mechanically interlocked whereby when the clutch is engaged the brake is automatically disengaged and when the clutch is disengaged the brake is automatically engaged, which arrangement provides not only a safety feature but also precludes damage that could occur if there were no mechanical interlock between the clutch and brake.

It is another object of the present invention to provide a new and improved clutch-brake unit of the above character which obviates the need for any rotary air shaft seals.

It is still another object of the present invention to provide a new and improved clutch-brake unit which permits changing the brake springs externally of the housing, thereby obviating the need for removing any complicated access plates or the like.

It is a further object of the present invention to provide a new and improved clutch-brake unit which may be operated as an interlocking adjustable clutch and brake, or alternatively, as an independent clutch and brake.

It is still another object of the present invention to provide a clutch-brake unit of the above described type which is readily adapted to be cooled by forced air, circulating oil, circulating water, or any combination thereof.

It is yet another object of the present invention to provide a new and improved clutch brake unit which obviates the need for any thrust plates which have heretofore been the cause of excessive wear in similar type units.

It is another object of the present invention to provide a new and improved clutch brake unit which will find universality of application.

Further important objects of the present invention are to provide a new and improved clutch brake unit of the character described which is simple and compact in design, economical to produce and operate, extremely rugged and maintenance-free during operation, and wherein the input and output shafts are readily adaptable for direct mounting thereon of any type machine member such as fly wheels, gears, sheaves, couplings, sprockets, etc.

Other objects and advantages of the present invention will become apparent from the following detailed description taken in conjunction with the accompanying drawings.

BRIEF DESCRIPTION OF THE DRAWINGS

FIG. 1 is a longitudinal side elevational view, partially broken away of a clutch-brake unit embodying the principles of the present invention;

FIG. 2 is an end elevational view of the right end of the clutch-brake unit illustrated in FIG. 1;

FIG. 3 is a transverse cross-sectional view taken substantially along the line 3—3 of FIG. 1; and FIG. 4 is an enlarged cross-sectional view of a portion of the spacer rods incorporated in the clutch-brake unit of the present invention.

DETAILED DESCRIPTION OF A PREFERRED EMBODIMENT

Referring now to the drawings, a clutch-brake unit 10, in accordance with a preferred embodiment of the present invention, is shown as comprising a generally rectangular-shaped housing 12 having longitudinally spaced end walls 14 and 16, laterally spaced side walls 18 and 20, and generally vertically spaced upper and lower walls 22 and 24. The side walls 18, 20 may be externally ribbed or finned, as seen at 26, and the upper wall 22 may be formed with a relatively large access opening 28 which is normally closed by a cover plate 30 that is secured via suitable screws, bolts or the like 32 and suitable fluid tight gasket means 34 to the upper side of the wall 22, the plate 30, when removed, providing for convenient access to the interior of the housing 12, as will be apparent.

The lower end of the housing 12 may be and preferably is provided with suitable mounting feet, generally designated 36, which are formed integrally of the housing 12 and define generally vertically disposed openings or bores 38 adapted to receive suitable mounting bolts, screws or the like for securing the unit 10 to any suitable associated support structure.

The end wall 14 of the housing 12 is formed with an integral, longitudinally extending, centrally disposed annular support section 40 which defines a central annular opening 42 through which a rotatable input shaft, generally designated 44, extends. The end wall 16 of the housing 12 is formed with a relatively large diameter opening 46 which is coaxially aligned with the opening 42 and is normally closed by an end plate assembly, generally designated 48, having a peripheral mounting portion 50 adapted to be secured by suitable screws, bolts or the like, generally designated 52, to the portion of the end wall 16 circumjacent the opening 46, as best illustrated in FIG. 2. Preferably, suitable fluid sealing gasket means 54 is provided interjacent the mounting portion 50 of the assembly 48 and the portion of the end wall 16 abuttingly engaged therewith. The assembly 48 defines a central annular opening 56 which is coaxially aligned with the opening 42 and is adapted to rotatably receive the outer end of a longitudinally extending output shaft, generally designated 58, which is adapted to be selectively operatively connected with the input shaft 44 by means of the clutch-brake unit embodying the present invention, as will hereinafter be described.

The input shaft 44 is rotatably supported by a plurality of anti-friction bearing assemblies, generally designated 60 and 62, the former of which is interposed between an annular shoulder portion 66 formed around the shaft 44 and the longitudinally outer end of the annular support section 40 of the end wall 14, suitable snap or retaining ring means 68 being provided directly outwardly from the assembly 60 for positioning the same relative to the shaft 44, as is conventional in the art. The bearing assembly 62 is interposed between an enlarged diameter section 70 of the input shaft 44 located interiorly of the end wall 14, and a generally longitudinally inwardly extending shoulder portion 72 provided on the interior side of the end wall 14. An antifriction bearing assembly 64 is interposed between a reduced diameter section 74 on the inner end of the output shaft 58 and an annular shoulder 76 formed around the radially inner side of a lug supporting section 78 provided on the inner end of the input shaft 44, as will later be described. A suitable fluid-tight oil seal or the like 80 is provided between the outer periphery of the shaft 44 and the inner periphery of the opening 42, and a suitable forced air fan blade assembly, generally designated 82, is adapted to be mounted on the outer end of the shaft 44 exteriorly of the end wall 14. By way of example, the assembly 82 may be fabricated of cast aluminum and have a central annular collar section 84 defining a central opening 86 within which the outer end of the input shaft 44 is received and fixedly connected. The assembly 82 may further comprise radially outwardly and longitudinally extending fan blade support means 88 adapted to carry a plurality of air circulating fan plates, generally designated 90. As will be apparent, rotation of the input 44 will result in simultaneous rotation of the assembly 82, whereby the fan plates 90 will circulate cooling air past the housing 12. If desired, a suitable control shroud, generally designated 92, may be provided adjacent the assembly 82 to control the flow of air circulated thereby. As shown in FIG. 1, such a shroud may have a generally radially inwardly extending section 94 and a generally longitudinally extending mounting section 96 adapted to be secured by suitable screws, bolts or the like 98 to the underside of the cover plate 30.

The outer end of the output shaft 58 is adapted to be rotatably supported within the end plate assembly 48 by means of a pair of adjacently oriented anti-friction bearing assemblies 100 and 102 which are interposed between the inner periphery of the opening 56 and an annular shoulder 104 formed around the output shaft 58. A suitable shaft retaining assembly, generally designated 106, is provided circumjacent the output shaft 58 and the periphery of the opening 56, the assembly 106 including suitable fluid-tight sealing means 108, as is well known in the art. The inner end of the output shaft 58 is supported for rotational movement with respect to the input shaft 44 by means of the aforementioned antifriction bearing assembly 64.

The output shaft 58 is formed with an enlarged diameter section 110 at a position substantially intermediate the end walls 14, 16 of the housing 12. The section 110 is provided with a radially inwardly extending recess 112 substantially midway between the opposite ends thereof, with the remaining portions of the outer surface of the section 110 on the opposite sides of the recess 112 being formed with external spline formations 114 and 116. A central split-ring member 118 having a central opening 120 is adapted to be snapped into engagement with the recess 112 of the shaft section 110, the member 118 defining longitudinally spaced, radially extending, generally parallel sides 122 and 124.

A first series of clutch friction discs, generally designated 126, having internal spline formations complementary to the formations 114 are splined on the formations 114, and a second series of brake friction discs, generally designated 128, identical to the discs 126, having internal spline formations complementary to the formations 116 are disposed in splined engagement with the formations 116 on the opposite side of the ring member 118 from the discs 126, as illustrated in FIG. 1.

A series of friction clutch plate members, generally designated 130, are each provided with a plurality of circumferentially spaced, radially inwardly extending notches adapted for keyed engagement with a plurality of longitudinally extending, circumferentially spaced drive lugs 132 that are mounted upon the supporting section 78 of the input shaft 44. In a preferred construction of the present invention, four of the drive lugs 132 are provided on the supporting section 78, with the friction clutch plate members 130 being formed with a corresponding number of keyed notches. As illustrated in FIG. 1, the plate members 130 are each internally bored, with the inner peripheral edges thereof being interposed between the outer peripheral edges of the clutch friction discs 126. Similarly, a series of friction brake plate members, generally designated 134, are each provided with a plurality of, but preferably four, keyed notches adapted for keyed engagement with a plurality of corresponding drive lugs 136 which are supported in the manner hereinafter to be described. The brake plate members 134 are each centrally bored, with the inner peripheral edges thereof being interposed between the outer peripheral edges of a series of brake friction discs 128, as shown in FIG. 1.

The plurality of drive lugs 136 are circumferentially spaced around the longitudinal axis of the output shaft 58 and are supported within the housing 12 by means of a suitable bracket assembly, generally designated 138, having a generally longitudinally extending section 140 to which the drive lugs 136 are secured. The assembly 138 is formed with a radially outwardly extending portion 142 adapted to be fixedly secured via suitable screws, bolts or the like 144 to an internal side portion 146 of the assembly 48. The assembly 138 further comprises an inwardly projecting flange portion 148 which is provided with O-ring sealing means 150 and 152 at the radially outer and innermost extremities thereof, the sealing means 150 being sealingly engageable with a generally longitudinally extending surface 153 defining a cylindrical chamber 154, and the sealing means 152 being adapted to seal against a radially outer side of an actuating piston member 156 that is reciprocally disposed within the chamber 154, as will be described.

Referring now in detail to the construction of the piston member 156, as shown in Fig. 1, said member comprises a generally cylindrically shaped sleeve section 158 defining a central, longitudinally extending bore 160 which is arranged coaxially of the longitudinal axis of the output shaft 58 and has the shaft 58 extending therethrough. The sleeve section 158 defines an external cylindrical surface 162 with which the sealing means 152 is sealingly engaged, as is an additional O-ring sealing means 164 provided on an inwardly extending shoulder portion 166 defined by the opening 56 of the plate assembly 48 directly interiorly of the anti-friction bearing assembly 100. The piston member 156 also comprises a radially outwardly extending section 168, the radially outermost portion of which is provided with suitable O-ring sealing means 170 adapted to be sealingly engaged with the surface 153.

The piston member 156 is adapted to be reciprocally mounted within the chamber 154 and be biased longitudinally thereof in response to differential forces exerted against the opposite sides of the section 168 thereof. More particularly, the piston 156 is adapted to be biased longitudinally toward the interior of the housing 12 or toward the left in FIG. 1 under the influence of a plurality of circumferentially spaced, longitudinally extending piston springs, generally designated 172, that are disposed one in each of a plurality of longitudinally extending, circumferentially spaced bores 174 formed in the plate assembly 48 radially outwardly from the opening 56. The interior ends of the springs 172 are adapted to bear directly against the outer side of the piston section 168, while the outer ends of the springs 172 are adapted to bear against suitable closure plugs 176 that are threadably received within enlarged diameter counterbores 178 formed in the outer ends of the bores 174. In a preferred construction of the present invention, the unit 10 is provided with six of the bores 174, each being provided with one of the springs 172; however, if it is desired to operate the unit 10 with different clutch and brake rates, one or more of the springs can be omitted, with the piston member 156 operating under the influence of less than the total number of six springs.

The chamber 154 is communicable through air passages 180 and 182 formed in the end wall 116 with a suitable fitting means 184 for communicating pressurized air from an air conduit 186. It will be seen that when pressurized air is communicated via the conduit 186 and passages 180 and 182 to the interior of the chamber 154, the entire piston member 156 will be biased longitudinally toward the right in FIG. 1 against the resistance of the springs 172. Similarly, at such times as the air pressure within the chamber 154 decreases below a preselected level, the piston member 156 will be biased toward the left in FIG. 1 by the springs 172. For purposes later to be described, the chamber 154 is communicable via suitable air passages 187, 188 and fitting means 190 with a pressurized air supply conduit 192 for communicating pressurized air to the exterior (right) side of the piston section 168, i.e., the opposite side of the piston 156 from the side thereof which is communicable with the pressurized air supplied through the conduit 186. Accordingly, in the event air under a preselected pressure is communicated through the conduit 192, fitting means 190 and fluid passages 187 and 188 to the piston section 168, the piston member 156 will move interiorly of the housing 12 or toward the left in FIG. 1.

Mechanical interlock means for either simultaneously compressing the clutch plate members 130 and the friction discs 126 together and relieving the frictional engagement between the brake plate members 134 and the brake friction discs 128, or alternatively, for simultaneously relieving the frictional engagement between the clutch plate members 130 and friction discs 126 and compressing the brake plate members 134 and the brake friction discs 128 together In response to reciprocable movement of the piston member 156, is achieved through the provision of three longitudinally extending, circumferentially spaced screws, generally designated 194 and three longitudinally extending, circumferentially spaced rods alternately arranged with respect to the screws 194 and generally designated by the numeral 195. The screws 194 and rods 195 are reciprocally or slidably disposed one within each of a plurality of longitudinally extending, circumferentially spaced bores, generally designated 196, formed in the enlarged diameter section 110 of the output shaft 58. The left ends of the plurality of screws 194, as viewed in FIG. 1, are externally threaded and are adapted to be fixedly secured to an annular clutch actuating member 198. Toward this end, the member 198 is formed with three longitudinally extending, circumferentially spaced bores 200 which are aligned with three of the bores 196. The left ends of the screws 194 are formed with reduced diameter externally threaded portions 202 which extend through the bores 200 and are fixedly secured to the member 198 through the provision of suitable locking nuts 204 threadably received thereon. The clutch actuating member 198 defines a generally radially extending face 206 which is adapted to cooperate with the side 122 of the central ring 118 in clampingly engaging the clutch plate members 130 and clutch friction discs 126, in a manner hereinafter to be described.

The ends of the screws 194 opposite that which are connected to the member 198, i.e., the right ends of the rods 195 as viewed in FIG. 1, are formed with reduced diameter threaded portions 208 and are adapted to be fixedly secured to a brake actuating assembly, generally designated 210, which operatively connects the rods 195, and hence the clutch actuating member 198, with the piston member 156.

The plurality of rods 195, which are alternately arranged with respect to the screws 194 circumferentially around the shaft 58, are adapted to abut at their opposite ends against axially adjustable set screws or the like 211 that are threadably mounted within suitable bores, such as the bores 200, formed in the actuating members 198 and member 212. The rods 195 act as spacer means for axially spacing the members 198 and 212 and for controlling the gap or spacing between the discs 128 and the face 234, with the relative axial spacing therebetween being controlled by suitable axial adjustment of the screws 211. It will be seen that a unitized assembly is provided by the rods 195 and screws 194 in that the screws 194 exert an axially compressive force upon the members 198, 212, while the rods 195 exert an axially outwardly directed force against said members, whereby to assure against any relative rotational, axial or circumferential movement between the members 198, 212, screws 194 and rods 195 upon the assembly thereof.

The member 212 is formed with a plurality of circumferentially spaced, longitudinally extending internally threaded bores 214 aligned with the bores 196 and having the end portions 208 of the rods 195 threadably received therein. The member 212 is fixedly connected to an actuating sleeve member 216 through a keyway 217 clampingly secured between suitable snap or retaining rings 220 and 221, whereby longitudinal movement of the sleeve member 216 will result in simultaneously longitudinal movement in the same direction of the member 212 and hence the actuating member 198 via the rods 195. The end of the member 216 opposite that which is connected to the member 212, is connected through a suitable anti-friction bearing assembly 222 to the sleeve section 158 to the piston member 156. It will be seen that the inner face 224 of the assembly 222 is retained between a shoulder 226 and a retaining ring 228 on the piston member 156, while the outer face of the assembly 222 is retained between a shoulder 230 and a retaining ring 232 on the member 216. With this arrangement, the entire assembly 210, as well as the member 198, will move longitudinally within the housing 12 upon longitudinal movement of the piston member 156; however, because of the provision of the antifriction bearing assembly 222, the assembly 210 and member 198 will be free to rotate about the longitudinal axis of the unit 10 relative to the piston member 156. The member 216 defines a generally radially extending face 234 which is cooperable with the side 124 of the central ring 118 in clampingly securing the brake plate members 134 and brake friction discs 128, in a manner hereinafter to be described.

The torque transmitting elements within the housing 12, i.e., the clutch plates 130, brake plates 134 and clutch friction discs 126 and brake friction discs 128 are intended to be rotatable in a bath of oil contained within the housing 12, with the result that a substantially high percent of the kinetic energy produced in starting and stopping heavy loads is transmitted by "shearing" the oil between the various friction plates, thus substantially increasing not only the life of these friction plates over those in clutch and brake units which operate dry, but also increasing the maximum operating speed of the unit 10 of the present invention. The non-cylindrical interior configuration of the housing 12 will be found to provide sufficient agitation of the oil so that it will most effectively traverse between the various torque transmitting elements rather than merely circulating statically in a smooth generally cylindrical current flow. In order to insure that sufficient oil is provided for the bearing assemblies 62, 64, 100, 102 and 222, the interior of the housing 12 is provided with a plurality of openings or oil passages, generally designated by the numeral 236. Additionally, suitable plugged openings (not shown) may be provided in the housing 12 for filling the same with the requisite oil to a predetermined level and for periodically checking the oil level.

Referring now to the overall operation of the clutch-brake unit 10 embodying the principles of the present invention, it will be seen that the torque transmitting portion of the clutch is characterized by an alternate arrangement of a plurality of clutch plate members 130 and a plurality of clutch friction discs 126, with one of the discs 126 being disposed adjacent the face 206 of the clutch actuating member 198 and another of the discs 126 being disposed adjacent the side 122 of the center ring 118. The torque transmitting portion of the brake is characterized by an alternate arrangement of a plurality of brake plate members 134 and a plurality of brake friction discs 128, with one of the discs 128 being disposed adjacent the side 124 of the center ring 118 and another of the discs 128 being adjacent the face 234 of the member 216.

Assuming the initial condition that the conduit 186 is connected to a source of pressurized air, at such time as it is desirable to engage the clutch, such pressurized air is communicated from the conduit 186 via the passages 182 and 180 into the chamber 154, thereby forcing the piston member 156 toward the right in FIG. 1 against the resistance of the plurality of springs 172. Such movement of the piston 156 will effect simultaneous longitudinal movement of the brake actuating assembly 210 and clutch actuating member 198 toward the right, thereby accomplishing two functions. First of all, the actuating member 198 compresses the plates 130 and discs 126 between the confronting face 206 and side 122, whereby to transmit the torque of the input shaft 44 to the output shaft 58. Secondly and simultaneously, the aforesaid longitudinal movement of the assembly 210 causes the face 234 of the member 216 to move longitudinally away from the adjacent disc 128, and thereby releasing the brake in order to permit free rotation of the output shaft 58. At such time as the pressure within the chamber 154 is relieved, the plurality of springs 172 become operable to longitudinally bias the piston member 156 toward the left in FIG. 1, with the result that the clutch actuating member 198 will move longitudinally away from the adjacent disc 126 in order to release the clutch, and simultaneously, the face 234 of the member 216 and side 124 of the center ring 118 will compressingly engage the plurality of plates 134 and discs 128 with one another, thereby engaging the brake. In the event the unit 10 is to be applied in operation wherein it is not deemed necessary to automatically engage the brake upon disengagement of the clutch, the springs 172 may be removed from their respective bores 174, and the conduit 192 may be connected to a suitable source of pressurized air which may be selectively communicated via the fitting means 190 and passages 187, 188 to effect longitudinal movement of the piston member 156 in the same manner as the springs 172 function, thereby providing for independent operation and actuation of the clutch and brake mechanisms, as might be found useful in machine tool applications when it is desired to maintain a freely rotatable spindle.

It will be noted that the axially opposite sides of the piston section 168 are designed so as to be of substantially equal area. With this construction, the amount of air that will be displaced from within the housing 12, for example, through a suitable air outlet passage 240 and breather mechanism 242, during each reciprocation of the piston member 156 will be minimized to the extreme. This, of course, will substantially eliminate oil, which is normally carried with the air discharged or displaced from within the housing 12, from accumulating on the exterior thereof, thus rendering the housing 12 substantially more sanitary and minimizing oil consumption of the unit 10 during operation thereof.

It will be seen from the above described embodiment of the brake unit 10, that the present invention features a number of improvements over similar type clutch-brake units heretofore known and used. A particularly important improvement resides in the fact that the piston member 156 is non-rotatable, thereby obviating the need for any rotating seals or the like. Another important advantage of the present invention resides in the fact that it is possible to change, remove or otherwise inspect the piston springs 172 by simply removing the plugs 176, thereby effecting a substantial savings in time and effort over comparable units heretofore used. Still another feature of the present invention resides in the fact that the clutch-brake unit 10 may be operated either as an interlocked adjustable clutch and brake unit, or the clutch and brake may be independently operated, depending upon whether or not the springs 172 are utilized instead of a source of pressurized air which is communicated to the piston chamber 154 via the conduit 192. Yet another feature of the present invention resides in the fact that effective cooling may be achieved by any one or a combination of cooling medias. For example, the clutch-brake unit 10 of the present invention is readily adapted to have suitable tubing, for example, arranged in a serpentine fashion in the lower end of the housing 12, which tubing may be communicated to a suitable source of cooling water that will supplement the cooling action of the fan assembly 82. Alternatively, the clutch-brake unit 10 is readily adapted to have cooling oil circulated through the housing 12 by merely providing suitable fittings therein, thereby greatly increasing the thermal capacity of the unit and the speed at which the unit may be operated.

Other features of the present invention reside in the elimination of any thrust plates which have heretofore been used to connect the actuating piston with the torque transmitting elements. It has been found that when such thrust plates are used in clutch-brake units of the type described herein, the unit pressures exerted thereby are such as to cause premature failure of certain components of the unit. Accordingly, the elimination of such thrust plates will be seen to enhance the durability and long operational life of the unit embodying the present invention.

While it will be apparent that the preferred embodiment illustrated herein is well calculated to fulfill the object above stated, it will be appreciated that the present invention is susceptible to modification, variation and change without departing from the proper scope or fair meaning of the subjoined claims.

I claim:

1. A clutch-brake unit comprising: a housing defining a central cavity between opposite longitudinally spaced end walls, one of said end walls having a plurality of circumferentially spaced, axially extending bores; a shaft extending coaxially through said opposite spaced end walls and comprising first and second coaxially arranged shaft sections; a series of radially disposed clutch plates mounted in said cavity for rotation with said first shaft section; a series of radially disposed brake plates spaced axially from said clutch plates and non-rotatably disposed in said cavity; a series of friction discs mounted on said second shaft section for rotation therewith and adapted for selective frictional engagement with said clutch and brake plates; clutch and brake actuating members located on axially opposite sides of said friction discs and movable axially of said shaft sections, with movement thereof in one direction serving simultaneously to frictionally engage said clutch plates with certain of said friction discs and to release the remaining friction discs from frictional engagement with said brake plates and with movement thereof in the other direction serving simultaneously to release said clutch plates from said frictional engagement with said certain friction discs and to frictionally engage said remaining friction discs with said brake plates; a non-rotatable piston member disposed in said housing coaxial of said shaft and movable between first and second positions for effecting axial movement of said actuating members; spring means located in said plurality of circumferentially spaced, axially extending bores for urging said piston member toward one of said positions; first pressure applying means including a pressurized fluid acting against one side of said piston member for urging said piston member toward the other of said positions against the bias of said spring means, and removable closure means also located in said plurality of circumferentially spaced, axially extending bores proximate one end of said spring means for providing access to said spring means to permit inspection and adjustment of said spring means without requiring entry into said cavity.

2. The clutch-brake unit as set forth in claim 1 wherein said non-rotatable piston is double sided and double acting, and wherein said unit further comprises second pressure applying means supplementing said spring means for urging said piston member toward said one position.

3. A clutch-brake unit as set forth in claim 1 which includes a plurality of rod members extending axially of said shaft and circumferentially spaced therearound, said rod members operatively connecting said clutch and brake actuating means for movement in response to movement of said piston member.

4. A clutch-brake unit comprising: a housing defining a central cavity between opposite longitudinally spaced end walls, one of said end walls having a plurality of circumferentially spaced, axially extending bores; drive shaft means comprising coaxially aligned input and output shaft sections rotatably mounted in said housing; said input shaft sections extending from one end of said housing and said output shaft section extending from the opposite end of said housing, common bearing means located in said cavity and rotatably connecting adjacent ends of said input and output shaft sections; a series of radially disposed clutch plates mounted in said cavity for rotation with said input shaft section; a series of radially disposed brake plates spaced axially from said clutch plates and non-rotatably disposed in said cavity; a series of friction discs mounted on said output shaft section for rotation therewith and adapted for selective frictional engagement with said clutch and brake plates; clutch and brake actuating means movable axially of said shaft sections, with movement thereof in one direction serving simultaneously to frictionally engage said clutch plates with certain of said friction discs and to release the remaining friction discs from frictional engagement with said brake plates and with movement thereof in the other direction serving simultaneously to release said clutch plates from said frictional engagement with said certain friction discs and to frictionally engage said remaining friction discs with said brake plates, a double sided, double acting non-rotatable piston member disposed in said housing and movable between first and second axial positions for effecting axial movement of said actuating means; first pressure applying means including a pressurized fluid acting against one side of said piston member for urging said member toward one of said axial positions; and second pressure applying means acting against the other side of said piston member for urging said member toward the other of said axial positions; said second pressure applying means including a plurality of resilient spring elements disposed one in each of said plurality of circumferentially spaced, axially extending bores.

5. The clutch-brake unit as set forth in claim 4 wherein said housing is cooled by air circulating means driven by one of said first and second coaxially arranged shaft sections and wherein said air circulating means comprises a plurality of air circulating fan elements.

6. A clutch-brake unit comprising;
a housing defining a central cavity between opposite exterior longitudinally spaced end walls, said housing including a plurality of circumferentially spaced axially extending bores;
a shaft extending coaxially through said opposite spaced end walls and comprising first and second coaxially arranged shaft sections, one end of one of said coaxially arranged shaft sections disposed in part within a recessed area of the other of said shaft sections;
anti-friction bearing means interposed between the inner periphery of said recessed area and the outer periphery of said one end of said shaft section for rotatably supporting said last mentioned section;
a series of radially disposed clutch plates mounted in said cavity for rotation with one of said shaft sections;
a series of radially disposed brake plates spaced axially from said clutch plates and non-rotatably disposed in said cavity;
a series of friction discs mounted on the other of said shaft sections for rotation therewith and adapted for selective frictional engagement with said clutch and brake plates;
clutch and brake actuating means movable axially of said shaft sections, with movement thereof in one direction serving simultaneously to frictionally engage said clutch plates with certain of said friction discs and to release the remaining friction discs from frictional engagement with said brake plates and with movement thereof in the other direction serving simultaneously to release said clutch plates from said frictional engagement with said certain friction discs and to frictionally engage said remaining friction discs with said brake plates;
a double sided, double acting non-rotatable piston member disposed in said housing coaxially of said shaft sections, and movable between a first position for effecting operation of the brake and a second position for effecting operation of the clutch;
spring means located in said axially extending bores for urging said piston member toward said first position;

means for communicating a pressurized media into said housing adapted to act against one side of said piston member for biasing said piston member toward said first position, and means for communicating a pressurized media into said housing adapted to act against the opposite side of said piston member for biasing said piston member toward said second position.

7. A clutch-brake unit as set forth in claim 6 wherein said axially extending bores are provided with removable closure means adapted to be easily removed from the exterior of said housing to provide access to said spring means and thereby permit convenient inspection of said spring means without requiring entry into said cavity.

8. A clutch-brake unit as set forth in claim 6 wherein said friction discs are arranged in first and second axially spaced groups, said first group of friction discs being selectively frictionally engageable with said clutch plates for drivingly connecting said first shaft section with said second shaft section and said second plurality of friction discs being selectively frictionally engageable with said brake plates to non-rotatably connect one of said shaft sections with said housing.

9. A clutch-break unit as set forth in claim 6 wherein said spring means comprises a plurality of helical spring elements disposed one within each of said circumferentially spaced, axially extending bores, said spring elements being disposed adjacent said piston member and bearing against one side thereof for resiliently urging said piston member toward one of said positions.

10. A clutch-brake unit as set forth in claim 6 which includes a quantity of hydraulic fluid within said cavity, said fluid being operable to transmit torque between said shaft sections by means of the viscous shear of said fluid between said plates and said discs.

11. A clutch-break unit as set forth in claim 6 wherein said spring means comprises a plurality of helical coil springs operable in a failsafe capacity to urge said piston member toward said first position to effect engagement of said brake plates with said certain friction discs upon a preselected reduction of the fluid pressure acting against said piston member.

12. A clutch-brake unit as set forth in claim 6 which includes means on and rotatable with one of said shaft sections for circulating a heat transfer media.

13. A clutch-brake unit as set forth in claim 6 which includes additional bearing means located interiorly of said spaced end walls and operable to rotatably support said shaft sections.

14. A clutch-brake unit as set forth in claim 13 wherein said additional bearing means comprises first and second ball bearing assemblies disposed interiorly of said spaced end walls and operable to rotatably support said first and second shaft sections, respectively.

15. A clutch-brake unit as set forth in claim 6 which includes mounting means integrally formed on the lower side of said housing for operatively supporting said unit upon a suitable support surface.

16. A clutch-brake unit as set forth in claim 6 wherein said spring means comprises a plurality of helical spring elements disposed one within each of said circumferentially spaced, axially extending bores, said spring elements bearing against one side of said piston member and operable in a failsafe capacity to urge said piston member toward said first position to effect engagement of said brake plates with said certain friction discs upon a preselected reduction of the fluid pressure acting against said piston member, and which includes a quantity of hydraulic fluid within said cavity, said fluid being operable to transmit torque between said shaft sections by means of the viscous shear of said fluid between said plate and said discs.

17. A clutch-brake unit as set forth in claim 6 which includes means on and rotatable with one of said shaft sections for circulating a heat transfer media, which includes additional bearing means located interiorly of said spaced end walls, said additional bearing means comprising first and second ball bearing assemblies disposed interiorly of said spaced end walls and operable to rotatably support said first and second shaft sections, respectively, and which includes mounting means integrally formed on the lower side of said housing for operatively supporting said unit upon a suitable support surface.

* * * * *